United States Patent [19]

Suzuki et al.

[11] 4,278,297
[45] Jul. 14, 1981

[54] WHEEL FOR AN ELASTIC U-SHAPED TIRE

[75] Inventors: Hitoshi Suzuki, Kawagoe; Masaharu Omagari, Shiki, both of Japan

[73] Assignee: Honda Giken Kogyo Kabushiki Kaisha, Tokyo, Japan

[21] Appl. No.: 68,594

[22] Filed: Aug. 22, 1979

[30] Foreign Application Priority Data

Aug. 30, 1978 [JP] Japan ................................ 53/118800

[51] Int. Cl.³ ............................................ B60B 19/00
[52] U.S. Cl. .............................. 301/6 D; 301/63 PW; 152/379.3
[58] Field of Search ........... 301/6 R, 6 D, 6 V, 63 R, 301/63 PW, 97, 98; 152/323, 324, 378, 375, 379.3; 180/19 R, 70 R, 255; 16/45

[56] References Cited

U.S. PATENT DOCUMENTS

| 2,505,794 | 5/1958 | Schofield | 301/6 D |
| 2,862,721 | 12/1958 | Wehner | 301/6 D |
| 3,387,894 | 6/1968 | Louik | 301/63 PW |
| 3,730,594 | 5/1973 | Zbikowski | 301/63 PW |
| 3,843,202 | 10/1974 | Lacerte | 301/63 R |

FOREIGN PATENT DOCUMENTS 1315160  4/1973  United Kingdom ............... 301/63 PW Primary Examiner—H. Grant Skaggs
Attorney, Agent, or Firm—Polster, Polster and Lucchesi

[57] ABSTRACT

A wheel for a light-weight vehicle having an integrally assembled structure of a boss, a disc, a rim, and a plurality of ribs, in which the rim having a flat outer surface is integrally formed on the outer peripheral surface of the disc, and a rubber tire having a U-shaped cross-section is fitted on this rim, the inside surfaces of the side walls of the U-shaped rubber tire being received on the radially extending ribs provided on both surfaces of the disc.

5 Claims, 4 Drawing Figures

WHEEL FOR AN ELASTIC U-SHAPED TIRE

BACKGROUND OF THE INVENTION

This invention relates to a wheel for various types of vehicles, and, more particularly, it is concerned with a wheel with solid tire for mounting on a light-weight vehicle such as a lawn mower, a push cart, and others.

SUMMARY OF THE INVENTION

It is an object of the present invention to provide wheel for light-weight vehicle having improved rigidity, reduced weight, and ground contact pressure as well as facility in exchange of the tire.

According to the present invention, generally speaking, there is provided a wheel for a light-weight vehicle, comprising, in an integrally assembled structure, a boss, a disc provided around the boss, a rim provided on the outer periphery of the disc, and a plurality of ribs radially provided on both surface sides of the disc, in which wheel a rubber tire having a U-shaped cross-section is fittingly mounted on the rim, and the inside surfaces of the side walls thereof are held by the radially extending ribs.

There has thus been outlined, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent constructions so far as they do not depart from the spirit and scope of the present invention.

BRIEF DESCRIPTION OF THE ACCOMPANYING DRAWINGS

Specific embodiments of the present invention have been chosen for the purpose of illustration and description, and are shown in the accompanying drawing, forming a part of the specification, in which:

FIG. 3 is also a side elevational view, partly in cross-section of the front wheel.

DETAILED DESCRIPTION OF PREFERRED EMBODIMENTS

In the following, the construction and functions of the tire according to the present invention will be described in specific detail in reference to a preferred embodiment as shown in the accompanying drawing.

Figure 1:
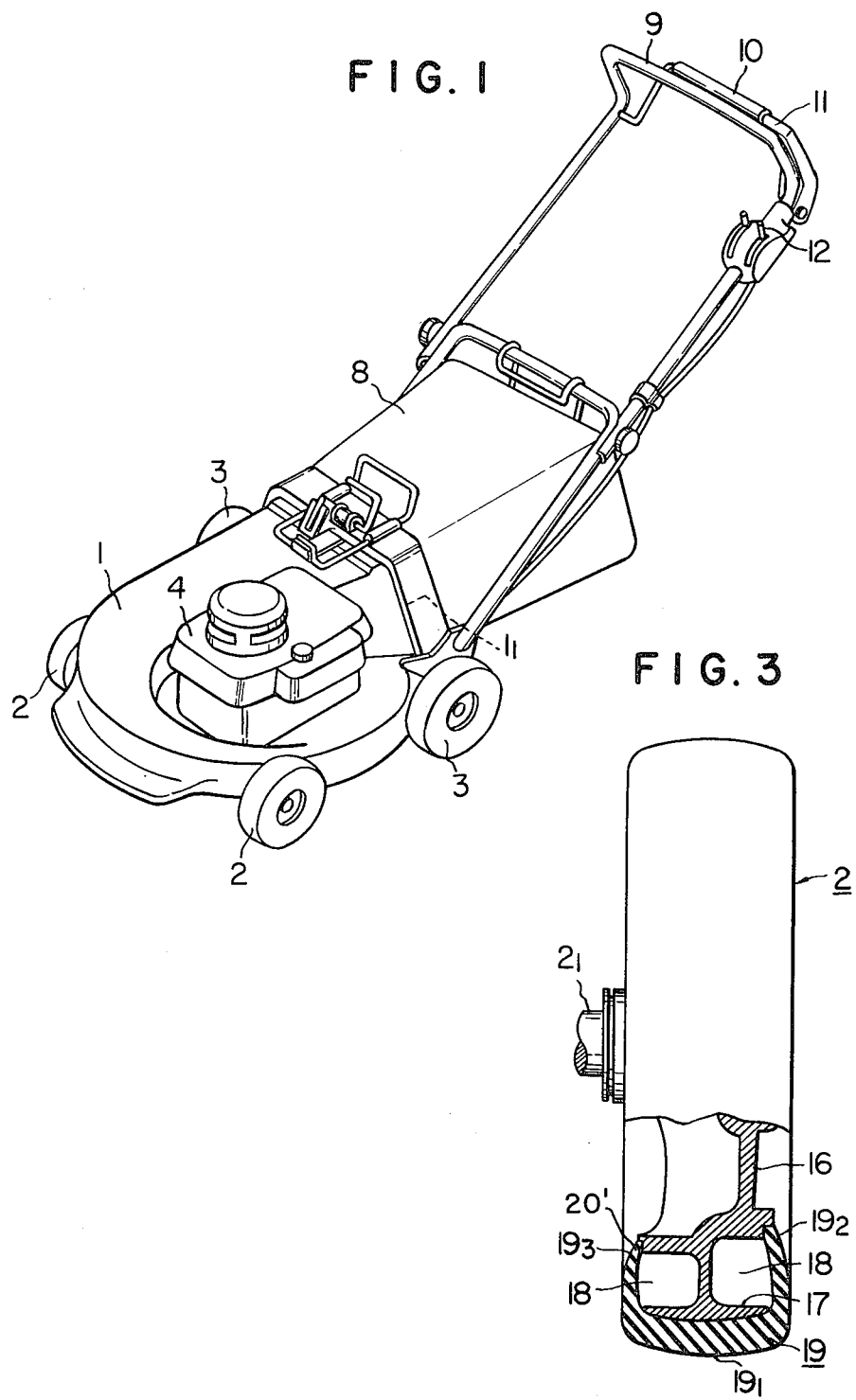
FIG. 1 is a perspective view of a power-operated lawn mower provided with the wheels according to the present invention.
Figure 2:
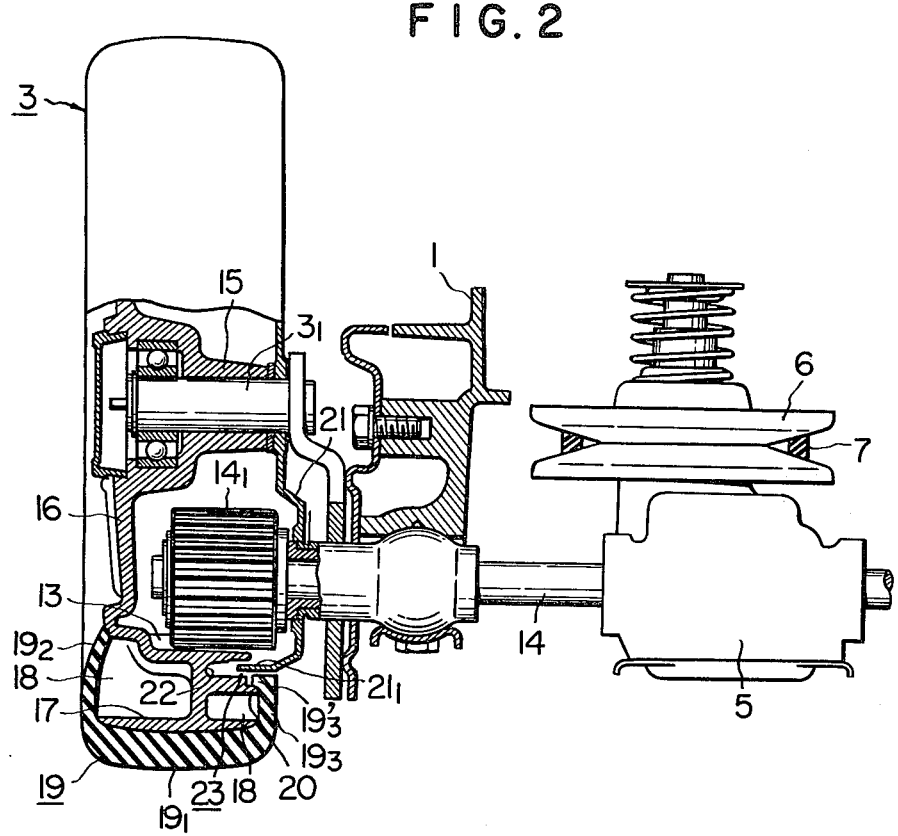
FIG. 2 is a side elevational view, partly in cross-section of the rear wheel (drive wheel) according to the present invention.
Figure 4:
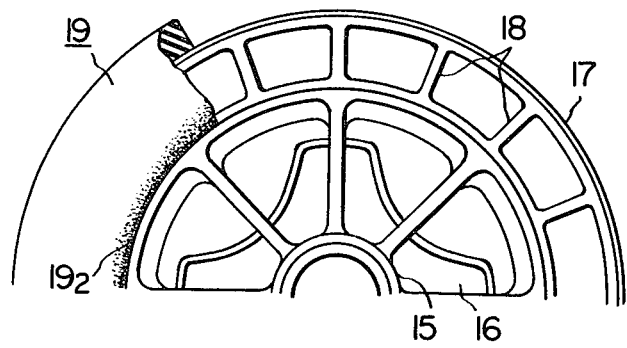
FIG. 4 is a front view, in part, of the wheel according to the present invention with a part of the rubber tire being removed from the outer periphery of the rim.

In FIG. 1, a reference numeral 1 designates a housing for accommodating therein a circular blade, the housing being open at its bottom, i.e., in a substantial shape of an inverted vessel having a top deck or platform, numerals 2, 2 refer to front wheels, numerals 3, 3 refer to rear wheels, a numeral 4 refers to a prime mover mounted on the top center surface of the housing 1. The prime mover may preferably be a vertical type engine. The circular blade fitted at the lower end of its ouput shaft rotates within the housing. Also, a rear wheel drive shaft 14 is rotated by a belt 7 extended between a pulley provided on the abovementioned output and another pulley 6 fitted on an input shaft of a travelling clutch 5 (shown in FIG. 2). A transmission mechanism may, in some occasion, be incorporated in conjunction with the belt 7 and the pulley 6. A reference numeral 8 designates a bag for collecting cut grass, and a numeral 9 refers to a handle fitted on one part of the housing 1. On this handle 9, there are mounted a lever 10 for turning on and off the cutting blade to rotate, another lever 11 for turning on and off the vehicle to travel by itself, an operating lever 12 for speed changing operation, and so forth.

When the prime mover 4 is started, the travelling clutch 5 is engaged to cause the vehicle to run, and a clutch for the cutting blade is also engaged to rotate the circular blade, thereby effecting the lawn mowing. The lawn as mowed is collected into a grass collecting bag 8 by the action of the centrifugal force due to rotation of the cutting blade. When an operator leaves his hand off the handle 9, the levers 10 and 11 return to their original positions, whereupon the rotation of the cutting blade and the self-propelling of the vehicle stop simultaneously. When the lever 11 alone is released, the lawn mowing operation can be done manually by hand-pushing the vehicle.

Each of the rear wheels 3, 3 has an internally toothed gear 13 around the inner periphery thereof, with which a pinion $14_1$ at the tip end of the drive shaft 14 is meshed.

Both front wheels 2, 2 and rear wheels 3, 3 are constructed with disc wheels, each being covered with a solid tire 19 on its outer periphery. A boss 15, a disc 16, and a rim 17 of the disc wheel are integrally molded with a hard synthetic resin material. The internally toothed ring gear 13 is also integrally formed with the rear wheel 3. The rim 17 is formed substantially flat and broad on its outer peripheral surface. A multitude of ribs 18 are radially provided on both inner and outer surfaces of the disc 16 in continuation to the edge of the rim 17. The solid tire 19 is made of rubber or similar material, and has a U-shaped cross-section. Appropriate anti-skid pattern is formed on its tread $19_1$. Side walls $19_2$ and $19_3$ become gradually thin toward its internal brim. The inside surface of the tread $19_1$ of the tire 19 fitted on the rim 17 is supported by the rim 17, while the inside surface of the side walls $19_2$ and $19_3$ are supported by the ribs 18. The inner top edge of the wall $19_3$ abuts a seat 20'.

The abovementioned side walls $19_2$ and $19_3$, when the height thereof is increased, would appear as if pneumatic tire were fitted. For easiness in exchange of the tire, however, the side wall $19_3$ to be the inner side of the wheel is made lower in height than the side wall $19_2$ to be the outer side of the wheel. The height of the side wall $19_3$ constituting the inner side of the rear wheel 3 is much lower than that of the front wheel 2, because of the internally toothed ring gear 13. However, it is apprehended that, when the rear wheel 3 is subjected to strong torque variations at the start of the vehicle running or speed changing, the tire 19 displaces relative to the rim 17, and simultaneously the inner side wall 19₃ which is lower than the outer side wall 19₂ is peeled, and gets off the rim 17. in order to prevent this from taking place, in the case of the rear wheel 3 as the drive wheel, a staged part or seat 20 is provided on the inner surface side of the disc 16 to be engaged with a bent edge 19₃' formed around the inner circumference of the lower side wall 19₃ of the tire 19. It should, however, be noted that this engagement construction between the inner peripheral edge 19₃' of the side wall 19₃ of the tire 19 and the engagement part 20 is not limited to the illustrated embodiment alone.

Furthermore, with a view to preventing dusts from entering into mesh-engaged section between the internally toothed ring gear 13 and the drive pinion 14₁, a cover plate 21 is fitted at the inner side of the wheel 3 as an integral part of the housing 1, and an outer peripheral flange 21₁ of the cover plate 21 is fitted into an annular groove 22 formed in the inner surface of the disc 16 so as to form a labyrinth 23.

Since the wheel according to the present invention is so constructed that, as mentioned in the foregoing, a rubber tire 19 in the shape of a letter "U" in its cross-section is fitted over the entire outer periphery of the rim 17, the inside surface of the tread is held by the rim 17, while the inside surfaces of both side walls 19₂ and 19₃ of the U-shaped rubber tire 19 are held by the radial ribs 18 provided on both surfaces of the disc 16, the amount of the material for the wheel may be small in spite of its being a solid tire, and the weight of the tire is lighter than the conventional solid tire of heavy wall thickness, and yet it has rigidity sufficiently durable against force applied thereto from the side surface as well as due to the weight of the vehicle body per se.

Further, since the outer peripheral surface of the rim 17 to hold the tread 19₁ of the tire is flat, and its inner peripheral surface is reinforced with ribs 18 to have sufficient rigidity, the wall thickness of the tire 19 may be made sufficiently thin. On acccount of this, even if the breadth of the tread 19₁ is widened to reduce the ground contact pressure, the increase in the amount of material to be used for the tire 19 is slight.

In case the boss 15, the disc 16, the rim 17 and the ribs 18 are formed integrally with a synthetic resin material, there accrues advantage of further weight reduction in conjunction with fitting of the rubber tire 19 in the U-shaped cross-section.

Moreover, in case the tire 19 is worn out, it can be easily removed from the rim 17 by peeling any of the side walls 19₂ or 19₃, or the lower side wall in case one of the side walls is made lower in height. In the reverse manner to the above, a new tire can be readily fitted on the rim. Therefore, the wheel according to the present invention is highly practical as the wheel for light-weight vehicle.

What is claimed is:

1. In a wheel for a light-weight vehicle, said wheel having an outboard side to be oriented away from said vehicle and an inboard side to be oriented toward said vehicle, the improvement comprising a central boss; a disc, substantially circular in side elevational view, extending radially outwardly from said boss and having a first part extending radially from said boss along the outboard side of said wheel, a second part, radially spaced from said boss, extending axially inboardly from said first part, a third part, radially offset outwardly from said second part, projecting in the axially inboard direction, said third part having an axially inboard free edge with a seat in it, a fourth part, intermediate the axially inboard and outboard edges of said second and third parts, extending radially outwardly, and a fifth, axially extending, rim part, on and extending both outboardly and inboardly from the radially outer edge of said fourth part, said rim part having a broad outer peripheral surface, and a tire of elastic material, asymmetrically U-shaped in transverse cross-section with an outboard side wall and an inboard side wall, the outboard side wall being higher than the inboard side wall and both side walls having peripheral brims, said tire being mounted on and around the broad outer surface of said rim, said peripheral brim of said inboard side wall being seated in the seat in the free edge of the third part of said disc.

2. The improvement of claim 1 wherein a radially inner, inboardly axially extending surface of said second part of said disc comprises an internally toothed ring gear.

3. The improvement of claim 1 wherein circumferentially spaced, radially extending ribs extend between a radially outer surface of said second part and a radially inner surface of said rim on the axially outboard side and between a radially outer surface of said third part and a radially inner surface of said rim on the axially inboard side of said fourth part, said ribs having free edges engaging the inner surfaces of said side walls of said tire.

4. The improvement of claim 1 wherein the seat in the third part is in the radially inward surface of said third part, and said inboard side wall brim has an axially outboardly turned bent edge projecting into and engaging a surface of said seat.

5. The improvement of claim 1 wherein the boss and disc are made in one piece of a synthetic resin material.

* * * * *